US009152288B2

(12) United States Patent
Dietz

(10) Patent No.: US 9,152,288 B2
(45) Date of Patent: Oct. 6, 2015

(54) REMOTE MULTI-TOUCH

(75) Inventor: Paul Dietz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 212 days.

(21) Appl. No.: 13/111,648

(22) Filed: May 19, 2011

(65) Prior Publication Data
US 2012/0293449 A1 Nov. 22, 2012

(51) Int. Cl.
*G06F 3/045* (2006.01)
*G06F 3/041* (2006.01)

(52) U.S. Cl.
CPC .............. *G06F 3/045* (2013.01); *G06F 3/0414* (2013.01); *G06F 2203/04104* (2013.01)

(58) Field of Classification Search
None
See application file for complete search history.

(56) References Cited

U.S. PATENT DOCUMENTS

| 2002/0140680 | A1* | 10/2002 | Lu .................................. 345/169 |
| 2004/0138849 | A1* | 7/2004 | Schmidt et al. ............... 702/127 |
| 2006/0244733 | A1* | 11/2006 | Geaghan ........................ 345/173 |
| 2007/0027923 | A1* | 2/2007 | Tsukazaki et al. ......... 707/104.1 |
| 2007/0075986 | A1* | 4/2007 | Chen ............................. 345/173 |
| 2008/0074400 | A1 | 3/2008 | Gettemy et al. |
| 2008/0231608 | A1* | 9/2008 | Nagata .......................... 345/173 |
| 2009/0128499 | A1 | 5/2009 | Izadi et al. |
| 2009/0256817 | A1* | 10/2009 | Perlin et al. ................... 345/174 |
| 2009/0284495 | A1 | 11/2009 | Geaghan et al. |
| 2010/0028811 | A1* | 2/2010 | Geaghan ....................... 430/319 |
| 2010/0283730 | A1* | 11/2010 | Miyazaki ...................... 345/158 |
| 2011/0055722 | A1* | 3/2011 | Ludwig ......................... 715/751 |
| 2011/0248948 | A1* | 10/2011 | Griffin et al. ................. 345/174 |
| 2012/0056825 | A1* | 3/2012 | Ramsay et al. ............... 345/173 |

OTHER PUBLICATIONS

Izadi, et al., "C-Slate: A Multi-Touch and Object Recognition System for Remote Collaboration using Horizontal Surfaces", Retrieved at << http://research.microsoft.com/pubs/72426/Criminisi_tabletop2007.pdf >>, 2007, pp. 8.

Kaltenbrunner, Martin, "reacTIVision and TUIO: A Tangible Tabletop Toolkit", Retrieved at << http://modin.yuri.at/publications/tuio_its2009.pdf >>, Proceedings of the ACM International Conference on Interactive Tabletops and Surfaces, Nov. 23-25, 2009, pp. 8.

(Continued)

*Primary Examiner* — Nicholas Lee
(74) *Attorney, Agent, or Firm* — Brandon Roper; Judy Yee; Micky Minhas

(57) ABSTRACT

A remote multi-touch system includes a pressure-sensitive, multi-touch device, a display separate from the pressure-sensitive, multi-touch device, and a controller communicatively coupled to the pressure-sensitive, multi-touch device and the display. The pressure-sensitive, multi-touch device measures a position at which one or more touches are executed on the pressure-sensitive, multi-touch device and, for each of the one or more touches, a force with which that touch is executed. The controller receives a touch report for each of the one or more touches from the pressure-sensitive, multi-touch device. Each touch report indicates the position at which that touch is executed and the force with which that touch is executed. The controller outputs to the display a pre-touch visualization command for displaying a pre-touch visualization. The pre-touch visualization is displayed at a location of the display mapped from the position at which that touch is executed on the pressure-sensitive, multi-touch device.

19 Claims, 3 Drawing Sheets

(56) References Cited

OTHER PUBLICATIONS

Hartmann, et al., "Augmenting Interactive Tables with Mice & Keyboards" Retrieved at << http://research.microsoft.com/pubs/81153/mice%20and%20keyboards%20on%20sulface.pdf >>, Proceedings of the 22nd annual ACM symposium on User interface software and technology, Oct. 4-7, 2009, pp. 4.

"Touchco to Revolutionize E-paper Interfaces", Retrieved at << http://www.epapercentral.com/touchco-to-revolutionize-epaper-interfaces.htm >>, Jan. 4, 2010, pp. 7.

"Magic TrackPad", Retrieved at << http://www.apple.com/magicmouse/ >>, Retrieved Date: Oct. 29, 2010, pp. 4.

"Magic Mouse", Retrieved at << http://www.apple.com/magicmouse/ >>, Retrieved Date: Oct. 29, 2010, pp. 3.

* cited by examiner

REMOTE MULTI-TOUCH

BACKGROUND

Touch screen devices allow a user to control the device by physically touching images presented on the device. For example, a virtual button displayed by the device can be physically touched on the device as a way of actuating the virtual button. Until recently, such touch screen devices have only been able to recognize one touch input at a time. However, advances in touch screen technology have allowed multiple touches to be concurrently recognized. With the development of multi-touch, touch screen devices, powerful multi-touch input modalities are being established. In particular, many multi-touch gestures have been created that are believed to increase user enjoyment and productivity.

SUMMARY

Remote multi-touch allows a user to perform multi-touch touch inputs on a pressure-sensitive, multi-touch device that is physically separated from a display device. The pressure-sensitive, multi-touch device measures a position at which one or more touches are executed. For each of the one or more touches, a force with which that touch is executed is measured. The display device displays a pre-touch visualization in response to gentle touches executed on the pressure-sensitive, multi-touch device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Remote multi-touch allows a user to control a user interface by touching a surface other than the display surface visually presenting the user interface. Instead of touching the display surface directly, gentle touches on a remote pressure sensing array are interpreted as "pre-touch" events. Visual indications of the gentle touches are presented on the display so that a user can aim virtual finger positions on the interface. At increased force levels, the touches are interpreted as touch events, equivalent to a user touching a conventional multi-touch display surface.

Figure 1:
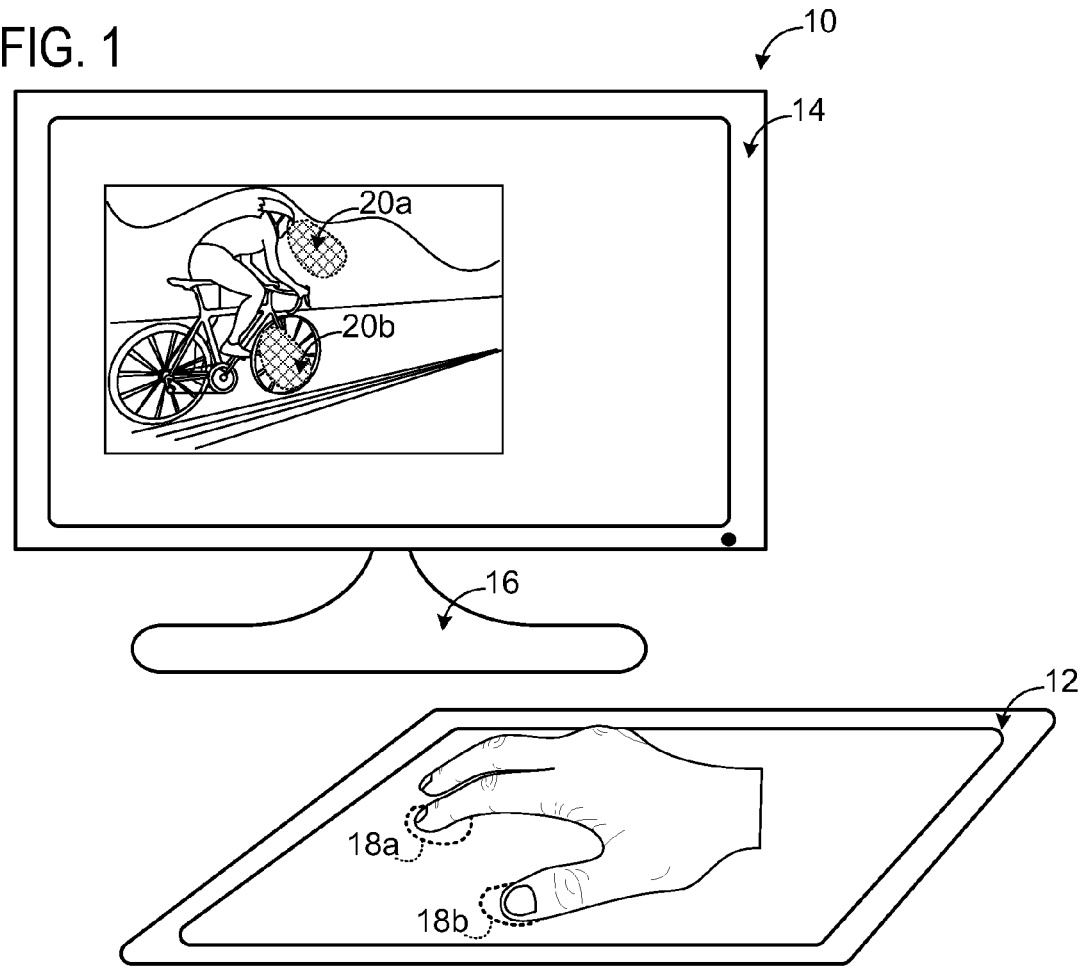
FIG. 1 shows a remote multi-touch system in accordance with an embodiment of the present disclosure.

FIG. 1 shows an example remote multi-touch system 10 that includes a pressure-sensitive, multi-touch device 12, a display 14, and a controller 16. In the illustrated embodiment, the pressure-sensitive, multi-touch device 12 and the display 14 are housed in different device enclosures. In other embodiments, the touch surface and the display may be housed in a common device enclosure (e.g., a laptop computing device with a pressure-sensitive, multi-touch track pad). The present disclosure is compatible with virtually any pressure-sensitive, multi-touch device that controls an interface that is presented on a display surface other than the surface on which the user executes touch inputs. For purposes of this discussion, such a display is referred to as being separate from the pressure-sensitive, multi-touch device, even though both may be housed in a common device enclosure.

The pressure-sensitive, multi-touch device 12 measures a position at which one or more touches are executed on the device 12. In other words, the device is configured to detect the location where a user touches the device with a fingertip, stylus, or other object. Such detection may be performed independently for two or more different touches. As such, if a user touches the device with two separate fingers, the device measures the independent positions of each touch on the device. In the illustrated example, the device independently measures position 18a where an index finger touches the device and position 18b where a thumb touches the device.

Furthermore, the pressure-sensitive, multi-touch device 12 measures the force with which each touch is executed. Like the position measurements, the force measurements are touch-specific. In other words, the force with which each touch is executed is measured independent of the force with which other touches are concurrently executed. It is to be understood that the pressure with which a touch is executed may alternatively and/or additionally be calculated by dividing the touch force by the area to which the touch is executed. In some embodiments, the pressure of each touch (i.e., force of touch divided by area to which touch is applied) can be used to determine the touch force; and in some embodiments, the force of each touch (i.e., pressure of touch multiplied by area to which touch is applied) can be used to determine the touch pressure. It is to be understood that the methods described herein may use force and/or pressure as a threshold criterion.

Controller 16 is communicatively coupled to the pressure-sensitive, multi-touch device 12 and the display 14. In the illustrated embodiment, controller 16 and display 14 are integrated into a common device in the form of an all-in-one personal computer. This is not intended to be limiting. The controller may be part of a stand-alone computer, part of the pressure-sensitive, multi-touch device 12, a component of an integrated device including both a display and a pressure-sensitive, multi-touch device, or otherwise incorporated in any suitable manner. Controller 16 is described in more detail with reference to FIG. 4.

Controller 16 may be communicatively coupled to the pressure-sensitive, multi-touch device 12 and/or the display 14 via any suitable wired or wireless connection. As nonlimiting examples, USB, USB 2.0, IEEE 1394, IEEE 802.15, IEEE 802.11x, HDMI, DVI, and/or direct bus connections may be used.

As explained in more detail below with reference to FIGS. 2 and 4, controller 16 is configured to implement logic for analyzing and processing multi-touch touch inputs that are executed on device 12. In particular, the controller is configured to recognize gentle touches as pre-touch events, and to cause the display to present corresponding pre-touch visualizations in response to such pre-touch events. For example, pre-touch visualization 20a is displayed in response to the input touch at position 18a, and pre-touch visualization 20b is displayed in response to the input touch at position 18b.

Further, the controller is configured to recognize firm touches as touch events, and to report such touch events so that further action may be taken.

Figure 2:
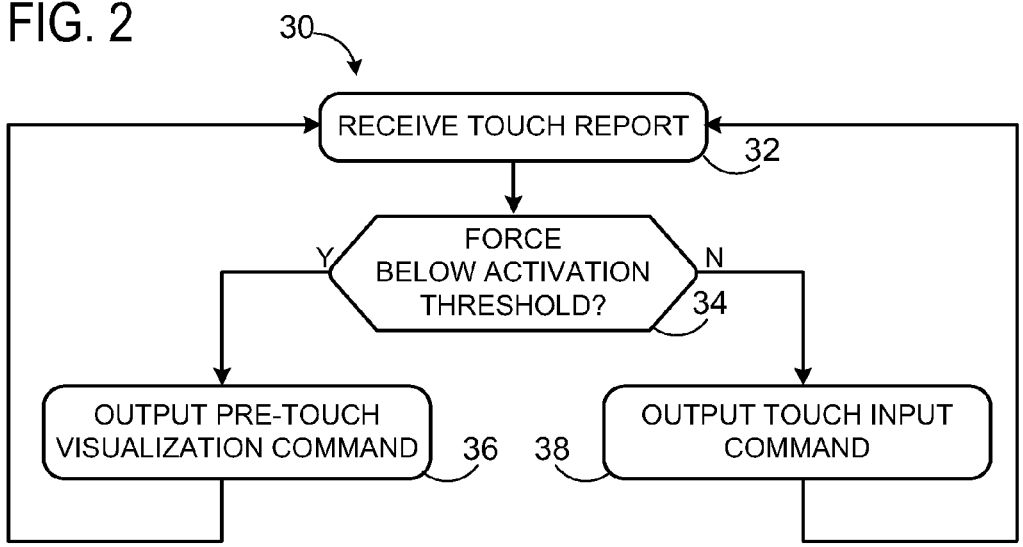
FIG. 2 shows an example method of managing remote multi-touch.

FIG. 2 shows an example method 30 of managing each of one or more touches executed on a remote pressure-sensitive, multi-touch device. At 32, method 30 includes receiving a touch report for each of one or more touches executed on a pressure-sensitive, multi-touch device. As an example, such a touch report may be received by controller 16 of FIG. 1. The touch reports are configured to provide information that is specific to a particular touch, so that different touches may be separately processed. For example, if first and second touches are concurrently executed, the position and the force of each touch may be reported in a manner that allows the touches to be considered independent of one another.

The format and mechanism of delivery of the touch report can vary without departing from the scope of this disclosure. In some embodiments, each touch report for each separate touch may be embodied as a unique data structure that is communicated from the pressure-sensitive, multi-touch device to the controller. In such embodiments, such data structures may be packaged together with other data structures reporting different touches. In some embodiments, the touch report for each of the one or more touches may be an aspect of a common data structure received from the pressure-sensitive, multi-touch device. Furthermore, the touch report for each of the one or more touches may be embodied as an aspect of a signal received from the pressure-sensitive, multi-touch device. In any case, the touch report for each of the one or more touches may include a value indicating a variable resistance of the pressure-sensitive, multi-touch device at a position of the pressure-sensitive, multi-touch device where that touch is executed. It is to be understood that the above examples are not limiting. Multiple touches may be reported in any suitable manner that allows the position and force of each different touch to be separately considered.

At 34, method 30 includes determining if a force with which a touch is executed is below an activation threshold. Such a determination may be made for each separate touch independent of other touches. However, for the sake of simplicity, the following description describes method 30 with reference to a single example touch. It is to be understood that this touch could be executed concurrently with other touches, and method 30 may be independently applied to such other touches.

If the force is below the activation threshold (YES at 34), method 30 proceeds to 36, where a pre-touch visualization command is output. For example, the pre-touch visualization command may be output from controller 16 of FIG. 1 to display 14 of FIG. 1. The pre-touch event may occur from a time of first touch until that touch reaches the activation threshold, and/or the pre-touch event may occur while a touch is applied with any predetermined range of forces.

The pre-touch visualization command is configured to cause a display to display a pre-touch visualization (e.g., pre-touch visualizations 20a and 20b of FIG. 1). The pre-touch visualization may have virtually any visual appearance without departing from the scope of this disclosure. As an example, the pre-touch visualization may look like a virtual fingertip—i.e., a semi-transparent finger object in the shape of a fingertip displayed on the display so that the interface may be viewed through the semi-transparent finger object. As another example, the pre-touch visualization may look like a cursor.

The pre-touch visualization is displayed at a location of the display that is mapped from the position at which the corresponding touch is executed on the pressure-sensitive, multi-touch device. In other words, each location of the pressure-sensitive, multi-touch device may be mapped to a corresponding location of the display so that touches to a particular location of the device will predictably result in a pre-touch visualization being displayed at a corresponding location of the display. In some cases, different portions of the same pressure-sensitive, multi-touch device may be mapped to different displays (e.g., in a multi-display system configuration). Alternatively, separate pressure-sensitive, multi-touch devices may be paired with the different displays in a multi-display configuration.

As introduced above, each different touch of a user may be separately processed, even when such touches are executed concurrently. As such, the pre-touch visualization commands for each of the one or more touches may be collectively configured to display pre-touch visualizations for all touches concurrently executed on the pressure-sensitive, multi-touch device. In other words, if a first touch and a second touch are concurrently executed, then a corresponding first pre-touch visualization and a corresponding second pre-touch visualization may be displayed together. The pre-touch visualizations are displayed while the corresponding touches are executed, thus providing the user with visual feedback as to where the user's touches will affect the user interface.

If the force is below the activation threshold (NO at 34), method 30 proceeds to 38, where a touch input command is output. For example, the touch input command may be output from controller 16 of FIG. 1 to an operating system, application, or virtually any other system entity configured to receive user input commands. The touch input command may be output via an application programming interface (API), a system message, or virtually any other suitable mechanism. The touch input command may be configured similarly to a corresponding type of command that is output by a conventional multi-touch input device when a user touches a multi-touch display screen. As such, software designed for conventional multi-touch screen devices may be used with remote multi-touch devices.

The touch input command indicates the position at which a touch is executed on the pressure-sensitive, multi-touch device. This may be accomplished by including, in the command, coordinates of the touch on the pressure-sensitive, multi-touch device, mapped coordinates of the display corresponding to the touched position on the pressure-sensitive, multi-touch device, and/or identification of a user interface element on which the pre-touch visualization is aimed.

Unlike a pre-touch, which may be used by a user to aim a finger to interact with a desired aspect of a user interface, the touch input command signals the actual multi-touch interaction with that aspect of the user interface. For example, a user may use a gentle pre-touch to position a pre-touch visualization on a virtual button of a user interface. In order to actuate that button, the user may more firmly press the pressure-sensitive, multi-touch device while the pre-touch visualization is aimed at the virtual button. If the firm touch exceeds the activation threshold, the touch input command signals that the button is to be actuated.

Figure 3:
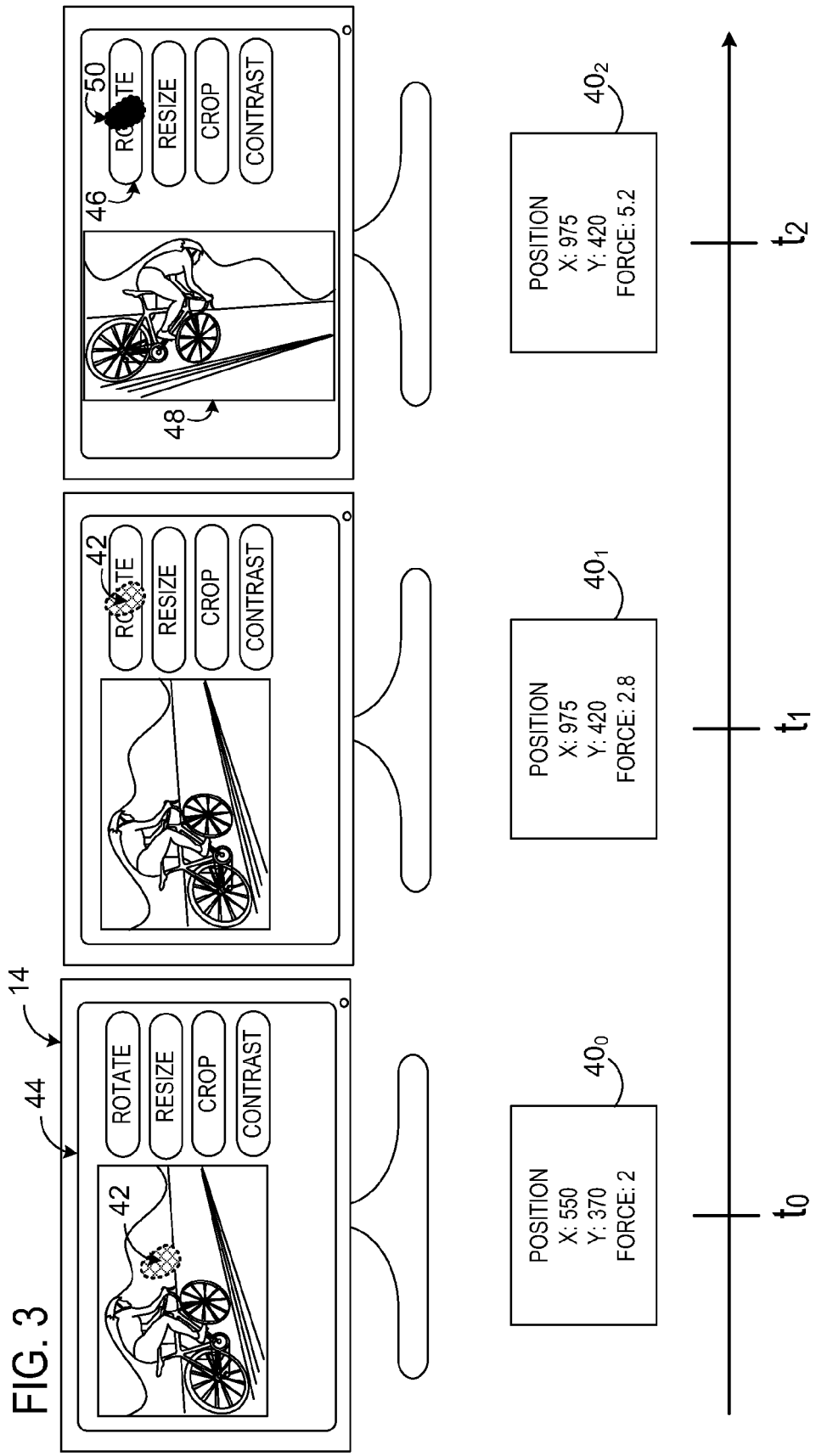
FIG. 3 shows a time sequence demonstrating a remote multi-touch scenario.

FIG. 3 shows a time sequence demonstrating such a scenario. In particular, FIG. 3 schematically shows remote multi-touch control of a photo-editing application. At time $t_0$, a user is touching a pressure-sensitive, multi-touch device (not shown). As indicated by example touch report $40_0$, the touch is being executed on the force-sensitive, multi-touch device at position [550, 370] with a relative force of [2]. It is to be understood that example touch report $40_0$ is provided for simplicity of understanding, not technical accuracy. Position and/or force may be reported in any suitable way. In this example, a pre-touch visualization 42 is presented on a user interface 44 that is displayed on display 14. The pre-touch visualization is displayed because the force of [2] is less than an activation threshold—e.g., an example activation threshold of [4].

At time $t_1$, the pre-touch visualization 42 moves across user interface 44 because the touch of the user moves across the pressure-sensitive, multi-touch device. In this example, touch report 40₁ indicates that the touch moves to position [975, 420], and that the touch is executed with a force of [2.8], which is still less than the example activation threshold of [4].

At time $t_2$, touch report 40₂ indicates that the touch has not moved but is now executed with a force of [5.2], which is above the example activation threshold of [4]. In other words, once the user aims the pre-touch visualization at button 46 with a gentle touch, the user executes a more firm touch. Because the touch force exceeds the activation threshold at time $t_2$, a touch input command is output to the example photo-editing application. As a result, the photo-editing application recognizes that the user has activated button 46, and thus executes a user interface operation associated with button 46—i.e., rotating photograph 48.

In the illustrated embodiment, a post-touch visualization 50 is displayed when the touch force exceeds the activation threshold. The post-touch visualization may have a different visual appearance than the pre-touch visualization. As nonlimiting examples, the post-touch visualization may be a different color, shape, and/or level of transparency than the pre-touch visualization. In some embodiments, the post-touch visualization may return to the pre-touch visualization if the force falls below the activation threshold but the touch is not fully lifted. The post-touch visualization provides the user with visual feedback as to when the device is touched with sufficient force to overcome the activation threshold.

Audio and/or haptic feedback may also be used to provide the user with feedback as to when the device is touched with sufficient force to overcome the activation threshold. In particular, a haptic feedback signal may be output to the pressure-sensitive, multi-touch device when the activation threshold is overcome and/or an audio signal may be output to a speaker. The haptic feedback signal may be configured to cause the pressure-sensitive, multi-touch device to provide haptic feedback to a user when a force with which a touch is executed exceeds the activation threshold. For example, the device may briefly vibrate when the force overcomes the activation threshold. Likewise, the audio signal may provide feedback in the form of a sound, such as a "click."

While the example illustrated in FIG. 3 shows a single touch, it is to be understood that the concepts discussed above may be applied to two or more touches that are concurrently executed. Furthermore, each touch input may be continuously monitored to determine each time a user exceeds an activation threshold and/or falls below an activation threshold.

In some embodiments, the activation threshold may remain static. In other words, the same threshold is used to determine when a pre-touch changes to a touch (i.e., via increasing force) and when a touch changes to a pre-touch (i.e., via decreasing force). In some embodiments, the activation threshold is selectively variable. In other words, the threshold from switching from a pre-touch to a touch and/or a touch to a pre-touch may change based on one or more factors. In some cases, a first activation threshold for a first touch may be selectively variable independent of a second activation threshold for a second touch.

In some embodiments, a different threshold is used to determine when a pre-touch changes to a touch (i.e., via increasing force) and when a touch changes to a pre-touch (i.e., via decreasing force). For example, the activation threshold may be selectively variable between at least a higher relative threshold and a lower relative threshold. The higher relative threshold may be used before a force with which a touch is executed initially exceeds the higher relative threshold—i.e., higher relative threshold for switching from pre-touch to touch. The lower relative threshold may be used after the force exceeds the higher relative threshold—i.e., lower relative threshold for switching back from touch to pre-touch.

When dragging a touch across the device, there may be unintended force variations. Because of this, the data may be filtered to ignore momentary dropouts.

When more than one finger is touching, the force provided by the wrist may be shared among a plurality of touch points. As such, the activation thresholds may be reduced as a function of the number of touch points.

Whether static or dynamic, the activation threshold can be set to any desired level. In general, the activation threshold is set to a level that allows gentle touches to be distinguished from firm touches so that a user can execute bi-modal touch inputs. Furthermore, the activation threshold may consider aspects other than absolute force. As an example, the activation threshold may consider a first and/or second order derivative of force over time. In this way, a sudden increase in absolute force may be recognized, and such increase may signal a user's desire to actuate a button or perform a similar action.

The activation threshold for each touch may function independently of the activation threshold for all other touches, or a standard activation threshold may be applied to all touches.

In some embodiments, the above described methods and processes may be tied to a computing system including one or more computers. In particular, the methods and processes described herein may be implemented as a computer application, computer service, computer API, computer library, computer device driver, and/or other computer program product.

Figure 4:
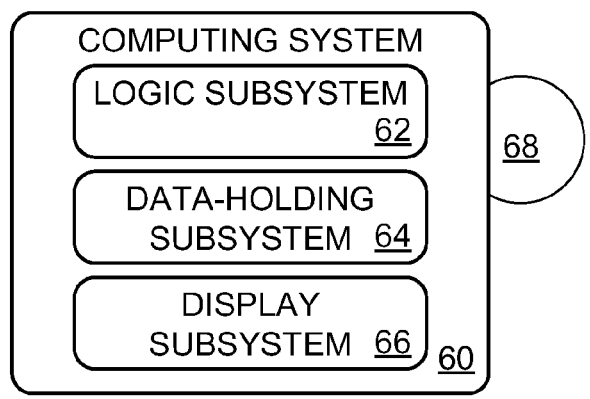
FIG. 4 schematically shows a computing system in accordance with an embodiment of the present disclosure.

FIG. 4 schematically shows a nonlimiting computing system 60 that may perform one or more of the above described methods and processes. As an example, controller 16 from FIG. 1 is an example implementation of computing system 60. Computing system 60 is shown in simplified form. It is to be understood that virtually any computer architecture may be used without departing from the scope of this disclosure. In different embodiments, computing system 60 may take the form of a mainframe computer, server computer, desktop computer, laptop computer, tablet computer, home entertainment computer, network computing device, mobile computing device, mobile communication device, gaming device, computer peripheral device (e.g., smart remote multi-touch device), etc.

Computing system 60 includes a logic subsystem 62, a data-holding subsystem 64, and a display subsystem 66.

Logic subsystem 62 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 64 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 64 may include removable media and/or built-in devices. Data-holding subsystem 64 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 64 may include devices with one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 4 also shows an aspect of the data-holding subsystem in the form of removable computer-readable storage media 68, which may be used to store and/or transfer data and/or instructions executable to implement the herein described methods and processes. Removable computer-readable storage media 68 may take the form of CDs, DVDs, HD-DVDs, Blu-Ray Discs, EEPROMs, and/or floppy disks, among others. While data and/or instructions may be transferred via computer-readable storage media 68, such data and/or instructions may be transferred to and/or from computing system 60 via a network, such as the Internet.

Display subsystem 66 may be used to present a visual representation of data held by data-holding subsystem 64 (e.g., pre-touch and post-touch visualizations). As the herein described methods and processes change the data held by the data-holding subsystem, and thus transform the state of the data-holding subsystem, the state of display subsystem 66 may likewise be transformed to visually represent changes in the underlying data (e.g., change from pre-touch to post-touch visualization). Display subsystem 66 may include one or more display devices utilizing virtually any type of technology. Such display devices may be combined with logic subsystem 62 and/or data-holding subsystem 64 in a shared enclosure, or such display devices may be peripheral display devices.

Figure 5:
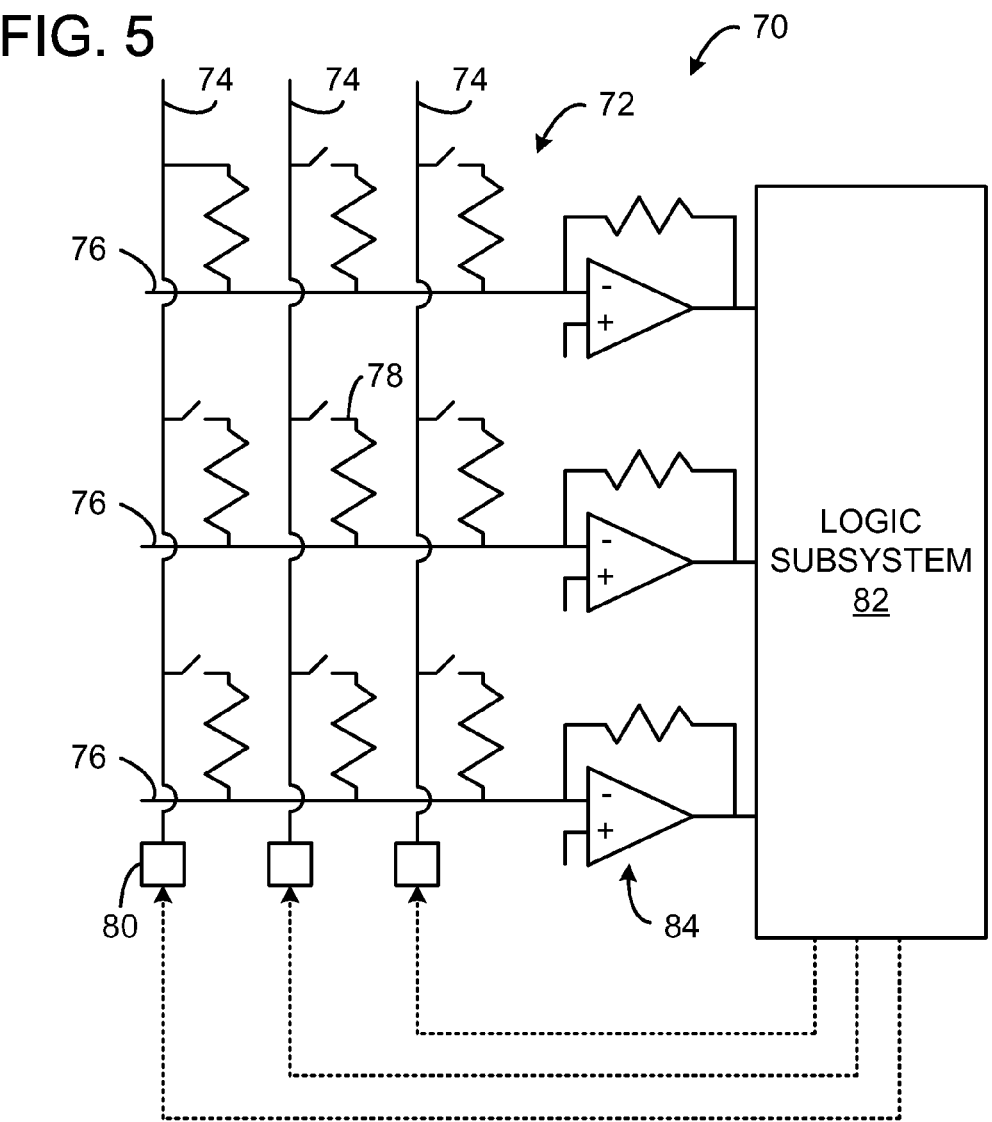
FIG. 5 shows an example resistor matrix of a pressure-sensitive, multi-touch device in accordance with an embodiment of the present disclosure.

The remote multi-touch techniques described herein may be applied to virtually any pressure-sensitive, multi-touch device. As one nonlimiting example, FIG. 5 schematically shows an embodiment of a pressure-sensitive, multi-touch device 70 including a resistor matrix 72. The resistor matrix 72 includes a plurality of column conductors 74 and a plurality of row conductors 76. The resistor matrix 72 includes a plurality of resistors 78. Each of the plurality of resistors 78 is located at a different intersection between a column conductor and a row conductor. Each of resistors 78 selectively connects a column conductor to a row conductor with a variable resistance.

Each of the plurality of resistors 78 may act as touch sensitive resistive switches that may be electrically closed by an applied force. The magnitude of the resistance associated with the resistive switch may be determined by the magnitude of the applied force. In other words, when no touch inputs are being physically applied to the pressure-sensitive resistive switches, the material has a high resistance and all of the switches are open.

The resistor matrix 72 may further include output pins 80 configured to apply a voltage to a corresponding column conductor. In some cases, one or more column conductors may be driven to a desired voltage and/or one or more column conductors may be held at a virtual ground. The output pins 80 may be coupled to a logic subsystem 82. The logic subsystem 82 may apply different voltages to different output pins 80 to drive corresponding columns to different (or the same) desired voltages including virtual ground. The logic subsystem 82 may be configured to vary the voltages applied to the output pins 80 rapidly as part of a fast scanning technique to measure resistances of resistors connected to selected row conductors 76 and/or column conductors 74 of the resistor matrix 72.

The resistor matrix 72 further includes a plurality of transimpedance amplifiers 84, each coupled to a corresponding row conductor 76 of the resistor matrix 72. Each of the transimpedance amplifiers 84 may act as a measurement circuit to measure a row current of a row conductor coupled to that transimpedance amplifier. Each of the transimpedance amplifiers 84 may be configured to hold a corresponding row conductor at virtual ground or another desired voltage to measure a row conductor. As an example, when a resistive switch is closed, such as due to the application of touch input, the row conductor and the column conductor are connected via the closed switch to complete the circuit. If the column conductor connected to the closed resistive switch is being held at a voltage that differs from the corresponding row conductor, current flows across the resistive switch to the transimpedance amplifier associated with that row. Since the transimpedance amplifier is holding the row at virtual ground, receipt of such current results in the transimpedance amplifier measuring the resulting row current to ground by outputting a proportional voltage to the logic subsystem 82. Accordingly, by setting a single column to a desired voltage while holding other columns in the row at virtual ground, a single resistor can set the current of each row and correspondingly the resistance of that resistor can be determined by the logic subsystem 82. The resistances measured at each of the plurality of resistors may then be analyzed and input touches applied to the pressure-sensitive, multi-touch device may be identified.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An apparatus comprising:
a display;
a multi-touch device;
a processor in communication with the display and the multi-touch device, the processor configured to:
receive a first touch report for a first touch executed on the multi-touch device, the first touch report indicating a position and force of the first touch;
receive a second touch report for a second touch executed on the multi-touch device, the second touch report indicating a position and force of the second touch;
filter the force of the first touch and the force of the second touch to ignore a momentary dropout of force caused by unintended force variation while dragging across the multi-touch device;
if the force of the first touch is below a first non-zero force threshold, output a first visualization command to display a pre-touch visualization at a first location on the display, the first location mapped from the position of the first touch;
if the force of the first touch exceeds the first non-zero force threshold, output a first touch input command to indicate the position of the first touch and decrease the first non-zero force threshold for return to pre-touch;
if the force of the second touch is below a second non-zero force threshold, output a second visualization command to display the pre-touch visualization at a second location on the display, the second location mapped from the position of the second touch; and
if the force of the second touch exceeds the second non-zero force threshold, output a second touch input command to indicate the position of the second touch.

2. The apparatus of claim 1, wherein the pre-touch visualization is concurrently displayed at the first and second locations while the first touch and the second touch are concurrently executed.

3. The apparatus of claim 1, wherein the pre-touch visualization is a fingertip image.

4. The apparatus of claim 1, wherein the first non-zero force threshold is equal to the second non-zero force threshold.

5. The apparatus of claim 1, wherein each of the first and second non-zero force thresholds is selectively variable.

6. The apparatus of claim 1, wherein the first and second non-zero force thresholds are selectively variable independent of one another.

7. The apparatus of claim 1, wherein the instructions are further executable to output a haptic feedback signal to the multi-touch device for providing haptic feedback to a user when a touch force exceeds a threshold.

8. A method comprising:
receiving a first touch report for a first touch executed on a multi-touch device, the first touch report indicating a position and force of the first touch;
receiving a second touch report for a second touch concurrently executed on the multi-touch device, the second touch report indicating a position and force of the second touch;
filter the force of the first touch and the force of the second touch to ignore a momentary dropout of force caused by unintended force variation while dragging across the multi-touch device;
reducing a first non-zero force threshold upon increase of a number of touch points detected concurrently on the multi-touch device;
if the force of the first touch is below the first non-zero force threshold, outputting a first visualization command to display a pre-touch visualization at a first location on a display, the first location mapped from the position of the first touch;
if the force of the first touch exceeds the first non-zero force threshold, outputting a first touch input command to indicate the position of the first touch and decrease the first non-zero force threshold for return to pre-touch;
if the force of the second touch is below a second non-zero force threshold, outputting a second visualization command to display a pre-touch visualization at a second location on the display while the pre-touch visualization is concurrently displayed at the first location, the second location mapped from the position of the second touch; and
if the force of the second touch is above the second non-zero force threshold, outputting a second touch input command to indicate the position of the second touch.

9. The method of claim 8, wherein the pre-touch visualization is a fingertip image.

10. The method of claim 8, wherein the first non-zero force threshold is equal to the second non-zero force threshold.

11. The method of claim 8, wherein each of the first and second non-zero force thresholds is selectively variable.

12. The method of claim 8, wherein the first and second non-zero force thresholds are selectively variable independent of one another.

13. The method of claim 8, further holding instructions executable by the logic subsystem to output a haptic feedback signal to the multi-touch device for providing haptic feedback to a user when a touch force exceeds a threshold.

14. An apparatus comprising:
a processor;
a memory in communication with the processor, the memory programmed with instructions executable to:
receive a first touch report for a first touch, the first touch report indicating a position and force of the first touch;
receive a second touch report for a second touch, the second touch report indicating a position and force of the second touch;
filter the force of the first touch and the force of the second touch to ignore a momentary dropout of force caused by unintended force variation while dragging across the multi-touch device;
compute a derivative of the force of the first touch with respect to time;
if the derivative of the force of the first touch is below a first non-zero force threshold distinguishing a sudden increase in the force of the first touch, output a first visualization command to display a pre-touch visualization at a first location, the first location mapped from the position of the first touch;
if the derivative of the force of the first touch exceeds the first non-zero force threshold, output a first touch input command to indicate the position of the first touch and decrease the first non-zero force threshold for return to pre-touch;
if the force of the second touch is below a second non-zero force threshold equal to the first non-zero force threshold, output a second visualization command to display the pre-touch visualization at a second location of the display, the second location mapped from the position of the second touch; and if the force of the second touch is above the second non-zero force threshold, output a second touch input command to indicate the position of the second touch.

15. The apparatus of claim 14, wherein the pre-touch visualization is concurrently displayed at the first and second locations while the first touch and the second touch are concurrently executed.

16. The apparatus of claim 14, wherein the pre-touch visualization is a fingertip image.

17. The apparatus of claim 14, wherein the instructions are further executable to output a haptic feedback signal to the multi-touch device for providing haptic feedback to a user when a touch force exceeds a threshold.

18. The apparatus of claim 1, wherein the instructions are further executable to display a post-touch visualization on the display if the force of the first touch exceeds the first non-zero force threshold.

19. The apparatus of claim 1, wherein the instructions are further executable to increase the first non-zero force threshold for subsequent touch detection if the force of the first touch falls below the first non-zero force threshold.

\* \* \* \* \*